US006323283B1

(12) United States Patent
Apostolo et al.

(10) Patent No.: US 6,323,283 B1
(45) Date of Patent: Nov. 27, 2001

(54) PEROXIDE CURABLE FLUOROELASTOMERS

(75) Inventors: Marco Apostolo, Novara; Margherita Albano, Milan, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/334,562

(22) Filed: Jun. 21, 1999

(30) Foreign Application Priority Data

Jun. 23, 1998 (IT) .............................. MI98A1429

(51) Int. Cl.[7] ...................................... C08L 27/12
(52) U.S. Cl. ............................ 525/199; 525/200
(58) Field of Search ..................... 525/199, 200

(56) References Cited

U.S. PATENT DOCUMENTS

| | | |
|---|---|---|
| 3,810,874 | 5/1974 | Mitsch et al. . |
| 4,035,565 | 7/1977 | Apotheker et al. . |
| 4,243,770 | 1/1981 | Tatemoto et al. . |
| 4,260,698 | 4/1981 | Tatemoto et al. . |
| 4,564,662 | 1/1986 | Albin . |
| 4,694,045 | 9/1987 | Moore et al. . |
| 4,745,165 | 5/1988 | Arcella et al. . |
| 4,789,717 | 12/1988 | Giannetti et al. . |
| 4,864,006 | 9/1989 | Giannetti et al. . |
| 4,943,622 | 7/1990 | Naraki et al. . |
| 5,173,553 | 12/1992 | Albano et al. . |

FOREIGN PATENT DOCUMENTS

| | | |
|---|---|---|
| 0 136 596 A2 | 4/1985 | (EP) . |
| 0 199 138 A2 | 10/1986 | (EP) . |
| 0 410 351 B1 | 12/1994 | (EP) . |
| 0 670 353 A | 9/1995 | (EP) . |

*Primary Examiner*—Nathan M. Nutter
(74) *Attorney, Agent, or Firm*—Arent Fox Kintner Plotkin Kahn

(57) ABSTRACT

Curable fluoroelastomers formed from the following fluoroelastomer mixtures:

a) from 20 to 70% by weight of a fluorolastomer having the Mooney viscosity value, ML (1+10) at 121° C., of greater than 60 points and containing from 0.01 to 3% by weight of iodine;

b) from 0 to 70% by weight of a fluoroelastomer having the Mooney viscosity value, ML (1+10) at 121° C., in the range of 20–60 points and containing from 0.2 to 5% by weight of iodine;

c) from 5 to 60% by weight of a fluoroelastomer having the Mooney viscosity value, ML (1+10) at 121° C., in the range of 1–20 points and containing an iodine percentage by weight greater than 0.3; said Mooney viscosity ML (1+10) at 121° C. determined according to the ASTM D 1646 method;

where said fluoroelastomers comprise monomeric units derived from a bis-olefin.

15 Claims, No Drawings

PEROXIDE CURABLE FLUOROELASTOMERS

The present invention relates to new fluoroelastomers cured by peroxides having improved mechanical and elastic properties.

Various fluoroelastomers are known, and they are widely used in those fields when outstanding elastic properties combined with high thermochemical stability are required. For a review of such products see, for instance, "Ullmann's Encyclopedia of Industrial Chemistry", vol. A-11, pp. 417–429 (1988, VCH Verlagsgesellschaft).

Fluoroelastomer curing can be carried out both ionically and with peroxides. In peroxidic curing, the polymer must contain curing sites capable of forming radicals in the presence of peroxides. To this purpose, cure-site monomers containing iodine and/or bromine can be introduced in the polymeric backbone as described, for example, in U.S. Pat. No. 4,035,565, U.S. Pat. No. 4,745,165 and EP 199,138. Alternatively, chain transfer agents containing iodine and/or bromine, which produce iodinated and/or brominated end groups (see for example U.S. Pat. No. 4,243,770 and U.S. Pat. No. 5,173,553), can be used during polymerization.

A drawback of the compounds for curing resides in difficult processing. In particular, it is well known that the fluoroelastomers cured by peroxides with respect to those cured ionically, exhibit poor elastic properties as shown by the high compression set values. In addition, there is a remarkable mold fouling leading to decreases in productivity and increases in waste.

The Applicant has surprisingly and unexpectedly found that it is possible to obtain new fluoroelastomers having superior mechanical, and compression set properties and excellent mold release properties.

An object of the present invention consists in curable fluoroelastomers substantially consisting of mixtures of the following fluoroelastomers:

a) from 20 to 70% by weight of a fluoroelastomer having a Mooney viscosity, ML (1+10) at 121° C., measured according to ASTM D 1646, greater than 60 points and containing from 0.01 to 3% by weight of iodine;

b) from 0 to 70% by weight of a fluoroelastomer having a Mooney viscosity, ML (1+10) at 121° C., measured according to ASTM D 1646, greater than 20 to 60 points and containing from 0.2 to 5% by weight of iodine;

c) from 5 to 60% by weight of a fluoroelastomer having a Mooney viscosity, ML (1+10) at 121° C., measured according to ASTM D 1646 method, in the range of 1–20 points and containing an iodine percentage by weight greater than 0.3; said fluoroelastomers comprising monomeric units derived from bis-olefins having the formula:

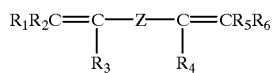

(I)

wherein:

$R_1$, $R_2$, $R_3$, $R_4$, $R_5$ and $R_6$ are equal to or different from each other, and are H or $C_1$–$C_5$ alkyls; Z is a $C_1$–$C_{18}$ alkylene or cycloalkylene radical, linear or branched, optionally containing oxygen atoms, preferably at least partially fluorinated, or Z is a (per)fluoropolyoxyalkylene radical.

Preferred compositions are:

a) from 20 to 50% by weight of a fluoroelastomer having a Mooney viscosity, ML (1+10) at 121° C., measured according to ASTM D 1646, greater than 70 points and containing from 0.05 to 2% by weight of iodine;

b) from 0 to 50% by weight of a fluoroelastomer having a Mooney viscosity, ML (1+10) at 121° C., measured according to ASTM D 1646, in the range of 30–50 points and containing from 0.2 to 3% by weight of iodine;

c) from 10 to 30% by weight of a fluoroelastomer having a Mooney viscosity, ML (1+10) at 121° C., measured according to ASTM D 1646, in the range of 5–15 points and containing an iodine percentage by weight greater than 0.5.

In formula (I), Z preferably is a $C_4$–$C_{12}$ perfluoroalkylene radical, wherein $R_1$, $R_2$, $R_3$, $R_4$, $R_5$ and $R_6$ preferably are hydrogen.

When Z is a (per)fluoropolyoxyalkylene radical, it preferably has the formula:

$$-(Q)_p-CF_2O-(CF_2CF_2O)_m(CF_2O)_n-CF_2-(Q)_p- \quad (II)$$

wherein:

Q is a $C_1$–$C_{10}$ alkylene or oxyalkylene radical; p is 0 or 1; m and n are integers such that the m/n ratio is between 0.2 and 5 and the molecular weight of said (per)fluoropolyoxyalkylene radical is in the range of 500–10,000, preferably 1,000–4,000. Preferably, Q is selected from:

$-CH_2OCH_2-$; $-CH_2O(CH_2CH_2O)_sCH_2-$; or s=1–3.

The bis-olefins of formula (I) wherein Z is an alkylene or cycloakylene radical can be prepared, for example, according to I.L. Knunyants et al. in Izv. Akad. Nauk. SSSR, Ser. Khim., 1964(2), pp. 384–386, while the bis-olefins containing (per)fluoropolyoxyalkylene sequences are described in U.S. Pat. No. 3,810,874.

The units derived from bis-olefins in the backbone are generally in the range of 0.01–1.0 moles, preferably 0.03–0.5 moles, still more preferably 0.05–0.2% moles per 100 moles of the other monomer in the backbone.

The base structure of the fluoroelastomer can be in particular selected from:

(1) VDF-based copolymers, wherein VDF is copolymerized with at least a comonomer selected from: $C_2$–$C_8$ perfluoroolefins, such as tetrafluoroethylene (TFE), hexafluoropropene (HFP); chloro- and/or bromo- and/or iodo-$C_2$–$C_8$ fluoroolefins, such as chlorotrifluoroethylene (CTFE) and bromotrifluoroethylene; (per)fluoroalkylvinylethers (PAVE) $CF_2=CFOR_f$, wherein $R_f$ is a $C_1$–$C_6$ perfluoroalkyl, for example trifluoromethyl, bromodifluoromethyl, pentafluoropropyl; perfluoro-oxyalkylvinylethers $CF_2=CFOX$, wherein X is a $C_1$–$C_{12}$ perfluorooxyalkyl having one or more ether groups, for example perfluoro-2-propoxy-propyl; non-fluorinated (Ol) $C_2$–$C_8$ olefins, for example ethylene and propylene;

(2) TFE-based copolymers, wherein TFE is copolymerized with at least a comonomer selected from: (per)fluoroalkylvinylethers (PAVE) $CF_2=CFOR_f$, wherein $R_f$ is as above defined; perfluorooxyalkylvinylethers $CF_2=CFOX$, wherein X is as above defined; $C_2$–$C_8$ fluoroolefins containing hydrogen and/or chlorine and/or bromine and/or iodine atoms; non-fluorinated (Ol) $C_2$–$C_8$ olefins.

Within the above defined classes, preferred base monomer compositions are:

(a) VDF 45–85%, HFP 15–45%, TFE 0–30%;
(b) VDF 50–80%, PAVE 5–50%, TFE 0–20%;
(c) VDF 20–30%, Ol 10–30%, HFP and/or PAVE 18–27%, TFE 10–30%;
(d) TFE 50–80%, PAVE 20–50%;
(e) TFE 45–65%, Ol 20–55%, VDF 0–30%;
(f) TFE 32–60%, Ol 10–40%, PAVE 20–40%; and
(g) TFE 33–75%, PAVE 15–45%, VDF 5–30%.

The fluoroelastomer mixtures of the invention are obtained by separately polymerizing the fluoroelastomers of a), b) and c) supra and subsequently coagulating the latexes obtained in the above mentioned ratios. Alternatively, a), b) and c) fluoroelastomer mixtures can be produced in situ in a single polymerization by suitably dosing the polymerization components during the polymerization reaction, as well-known to those of ordinary skill in the art.

The preparation of the fluoroelastomers of the present invention can be carried out by copolymerizing the monomers in an aqueous emulsion according to well known methods, in the presence of radical initiators (for example alkaline or ammonium persulphates, perphosphates, perborates or percarbonates), optionally in combination with ferrous, cuprous or silver salts, or of other easily oxidizable metals. In the reaction medium surfactants of various types are usually present, among which the fluorinated surfactants of formula:

$$R_f\text{—}X^-M^+$$

are particularly preferred, wherein $R_f$ is a $C_5$–$C_{16}$ (per)fluoroalkyl chain or a (per)fluoropolyoxyalkylene chain, $X^-$ is —$COO^-$ or —$SO_3^-$, $M^+$ is selected from: $H^+$, $NH_4^+$, or an alkaline metal ion. The most commonly used are: ammonium perfluoro-octanoate, (per) fluoropolyoxyalkylenes ended with one or more carboxyl groups, etc.

The amount of bis-olefin to be added to the reaction mixture depends on the amount desired in the final product. It has to be noted that, at the low amounts used according to the purposes of the present invention, practically all the bis-olefin present in the reaction medium enters into the chain.

When the copolymerization is completed, the fluoroelastomer is isolated by conventional methods, such as by coagulating the addition of electrolytes or by cooling.

Alternatively, the polymerization reaction can be carried out in bulk, or in suspension, according to well-known techniques, in an organic liquid wherein a suitable radical initiator is present.

The polymerization reaction is generally carried out at temperatures in the range of 25°–150° C., under pressure up to 10-MPa.

The preparation of the fluoroelastomers, which is an object of the present invention is preferably carried out in aqueous emulsion in the presence of a perfluoropolyoxyalklene emulsion, dispersion or microemulsion, according to U.S. Pat. No. 4,789,717 and U.S. Pat. No. 4,864,006.

The iodine containing fluoroelastomers of the present invention are curable with peroxides. Optionally, the fluoroelastomers contain bromine atoms in the backbone as a cure site or as terminal ends. The introduction of iodine atoms, optionally bromine atoms, can be carried out by addition, in the reaction mixture, of brominated and/or iodinated cure-site comonomers, such as bromine and/or iodine olefins having from 2 to 10 carbon atoms (as described for example in U.S. Pat. No. 4,035,565 and U.S. Pat. No. 4,694,045), or iodine and/or bromine fluoroalkylvinylethers (as described in U.S. Pat. No. 4,745,165, U.S. Pat. No. 4,564,662 and EP-199,138). The amount of bromine is substantially the same as the quantity of iodine or a bit more.

In the alternative, or also in association with the "cure-site" comonomers, it is possible to introduce terminal iodine atoms, optionally bromine atoms, by adding to the reaction mixture iodinated and/or brominated chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers in the range of 0–2, with $1 \leq x+y \leq 2$ (see for example U.S. Pat. No. 4,243,770 and U.S. Pat. No. 4,943,622). It is also possible to use as chain transfer agents alkaline or earth-alkaline metal iodides and/or bromides, according to U.S. Pat. No. 5,173,553.

Optionally, in association with the chain transfer agents containing iodine, optionally bromine, other chain transfer agents known in the art can be used, such as ethyl acetate, diethylmalonate, etc.

Peroxide curing is carried out, according to known techniques, by adding a suitable peroxide capable of generating radicals by heating.

Among the most commonly used are: dialkyl-peroxides, such as for example di-terbutyl-peroxide and 2,5-dimethyl-2,5-di(terbutylperoxy)hexane; dicumyl peroxide; di-benzoyl peroxide; diterbutyl perbenzoate; di[1,3-dimethyl-3-(terbutylperoxy)butyl] carbonate. Other peroxide systems are described, for example, in patent applications EP 136,596 and EP 410,351. To the curing mixture other products are then added, such as (a) curing coagents, in amounts generally in the range of 0.5–10%, preferably 1–7%, by weight with respect to the polymer; among those commonly used are: triallyl-cyanurate; triallyl-isocyanurate (TAIC); tris (diallylamine)-s-triazine; triallylphosphite; N,N-diallyl-acrylamide; N,N,N',N'-tetraallyl-malonamide; trivinyl-isocyanurate; 2,4,6-trivinyl-methyltrisiloxane; N,N'bisallylbicyclo-oct-7-ene-disuccinimide (BOSA); bis-olefin of formula (I), triazines having the general formula:

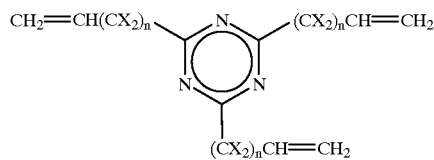

wherein X can be independently hydrogen, chlorine, fluorine $C_1$–$C_3$ alkyl or perfluoroalkyl; n is an integer in the range of 2–20, preferably 4–12, more preferably 4–8. TAIC is particularly preferred;

(b) a metal compound, in amounts in the range of 1–15% by weight, preferably 2–10%, with respect to the polymer, selected from oxides or hydroxides of divalent metals, such as for instance, Mg, Zn, Ca or Pb, optionally associated with a weak acid salt, such as for example, Ba, Na, K, Pb, Ca stearates, benzoates, carbonates, oxalates or phosphites;

(c) other conventional additives, such as thickeners, pigments, antioxidants, stabilizers and the like. It is also possible to use mixed curing systems, both ionic and peroxidic, as described in EP 136,596.

The Applicant has also found that the fluoroelastomers of the invention exhibit very good processability resulting in higher productivity and a reduction of waste.

With the fluoroelastomers of the present invention, it is possible to produce manufactured articles such as O-rings, shaft seals, gaskets, etc., preferably O-rings having improved compression set.

The present invention will now be better illustrated by the following examples, which are merely illustrative and are not intended to limit the scope of the invention.

EXAMPLES

CHARACTERIZATION

Mooney Viscosity ML (1+10') Determined at 121° C. (ASTM D 1646)

The curing curve of an obtained composition obtained by an Oscillating Disk Rheometer (ODR) manufactured by Monsanto (Model 100 S) has been determined according to the ASTM D2084-81. This is accomplished by operating at 177° C. at a 3° oscillation amplitude.

The (ODR) data are reported in the Tables: ML (minimum torque); MH (maximum torque); $t_{S2}$ (time required for a torque increase of 2 lb. in over ML); $t_{S50}$ (time required for a torque increase of 50 lb. in over ML); $t'_{90}$ (time required for a torque increase of 50% and 90%, respectively).

On the cured product:

the compression set on O-ring at 200° C. for 70 h after post-curing at 200° C. for 8 h (ASTM D395); and the post-curing mechanical properties at 200° C. for 8 h (ASTM D412-83) were determined and reported in the Tables.

EXAMPLE 1

EXAMPLE 1A

Average Mooney Polymer Synthesis

In a 22 l autoclave, equipped with stirrer working at 460 rpm, were introduced 14.5 l of demineralized water and 149.36 ml of a perfluoropolyoxyalkylene microemulsion previously obtained by mixing:

32.34 ml of an acid ended perfluoropolyoxyalkylene having the formula:

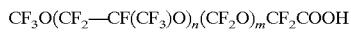

$CF_3O(CF_2-CF(CF_3)O)_n(CF_2O)_mCF_2COOH$ wherein n/m=10, having average molecular weight of 600;

32.34 ml of a 30% by volume $NH_4OH$ aqueous solution;

64.68 ml of demineralized water;

20 ml of Galden®D02 of formula:

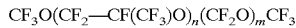

$CF_3O(CF_2-CF(CF_3)O)_n(CF_2O)_mCF_3$ wherein n/m=20, having average molecular weight of 450.

The autoclave was then heated to 85° C. and maintained at such temperature for all the reaction duration. The following monomers mixture was then fed:

| vinylidene fluoride (VDF) | 60% by moles |
| perfluoromethylvinylether (MVE) | 34% by moles |
| tetrafluoroethylene (TFE) | 6% by moles | to bring the pressure to 30 bar.

Into the autoclave were then introduced:

0.58 g of ammonium persulphate (APS) as initiator;

56.3 g of 1,6-diiodoperfluorohexane ($C_6F_{12}I_2$) as a chain transfer agent;

27.8 g of bis-olefin of formula $CH_2=CH-(CF_2)_6-CH=CH_2$; the addition was carried out in 20 parts, each part of 1.39 g, beginning from the polymerization starting and for every 5% increase in the monomer conversion.

The 30 bar pressure was maintained constant for the duration of the polymerization by feeding a mixture consisting of:

| VDF | 75% by moles |
| MVE | 17% by moles |
| TFE | 8% by moles |

After 135 minutes of reaction, the autoclave was cooled, and the latex was discharged. 455 g/l of water of product with polymer Mooney viscosity, ML (1+10) at 121° C. (ASTM D 1646), equal to 44, were obtained. The iodine percentage in the polymer is equal to 0.3% by weight. The molar composition measured by fluorine NMR is:

| VDF | 78.5% by moles |
| MVE | 17.5% by moles |
| TFE | 4% by moles |

EXAMPLE 1B

High Mooney Polymer Synthesis

By following the same procedure described for the polymerization 1A, a polymer of the same type was prepared wherein the iodinated 1,6-diiodoperfluorohexane transfer agent amount was of 39 g.

After 107 minutes of reaction, the autoclave was cooled, and the latex was discharged. 441.4 g/l of water of product with polymer Mooney viscosity, ML (1+10) at 121° C. (ASTM D 1646), equal to 94, were thus obtained. The iodine percentage in the polymer is equal to 0.2% by weight. The molar composition measured by fluorine NMR is:

| VDF | 78.5% by moles |
| MVE | 17.0% by moles |
| TFE | 4.5% by moles |

EXAMPLE 1C

Low Mooney Polymer Synthesis

By following the same procedure described for the polymerization 1A, a polymer of the same type was prepared wherein the iodinated 1,6-diiodoperfluorohexane transfer agent amount was of 161.9 g and 24.4 of bis-olefin fed in 20 parts, each part of 1.22 g.

After 140 minutes of reaction, the autoclave was cooled, and the latex was discharged. 458 g/l of water of product with polymer Mooney viscosity, ML (1+10) at 121° C. (ASTM D 1646), equal to 7, were thus obtained. The iodine percentage in the polymer is equal to 0.45% by weight. The molar composition measured by fluorine NMR is:

| | |
|---|---|
| VDF | 79% by moles |
| MVE | 17.0% by moles |
| TFE | 4.0% by moles |

The latexes obtained in methods 1A, 1B, 1C were cocoagulated in the ratio; 40% by weight of latex 1A, 40% by weight of latex 1B and 20% by weight of latex 1C.

The Mooney viscosity ML (1+10) at 121° C. (ASTM D 1646) of the so obtained polymer was equal to 50.

The polymer was then cured by peroxide: the blend composition and the characteristics of the cured product are reported in Table 1.

EXAMPLE 2 (comparative)

The synthesis 1A of Example 1 was repeated.

After 98 minutes of reaction, the autoclave was cooled, and the latex was discharged, coagulated, washed and dried. 455 g/l of water of product with polymer Mooney viscosity, ML (1+10) at 121° C. (ASTM D 1646), equal to 48, were thus obtained. The iodine percentage in the polymer is equal to 0.32% by weight. The molar composition measured by fluorine NMR is:

| | |
|---|---|
| VDF | 78.5% by moles |
| MVE | 17.0% by moles |
| TFE | 4.5% by moles |

The characteristics of the product cured by peroxides are reported in Table 1.

TABLE 1

| EXAMPLE | | 1 | 2(*) |
|---|---|---|---|
| Blend composition | | | |
| Polymer | (g) | 100 | 100 |
| Luperco(R) 101 XL | (phr) | 2 | 2 |
| Drimix(R) TAIC | (phr) | 4.5 | 4.5 |
| ZnO | (phr) | 4 | 4 |
| Akrochem blue 602 C | (phr) | 0.3 | 0.3 |
| BaSO4 | (phr) | 35 | 35 |
| Tremin 283 660 Est | (phr) | 35 | 35 |
| Blend characteristics | | | |
| *Mooney viscosity ML (1 + 10') 121° C. (ASTM D1646) | | 52 | 48 |
| *ODR 177° C. arc 3, 12' | (ASTM D2084-81) | 15 | 15 |
| ML | (pounds · inch) | 134 | 136 |
| MH | (pounds · inch ) | 54 | 54 |
| $t_{s2}$ | (sec) | 87 | 90 |
| $t_{s50}$ | (sec) | 150 | 132 |
| $t'_{90}$ | (sec) | | |
| Characteristics after post-curing in stove at 230° C. for 4 hours | | | |
| *MECHANICAL PROPERTIES | (ASTM D412-83) | 6.0 | 5.2 |
| Modulus at 100% | (MPa) | 12.0 | 8.0 |
| Stress break | (MPa) | 330 | 249 |
| Elongation at break | (%) | 76 | 72 |
| Shore A Hardness | (points) | | |

TABLE 1-continued

| EXAMPLE | | 1 | 2(*) |
|---|---|---|---|
| *COMPRESSION SET at 200° C. for 70 hrs (ASTM D395 Method B) O-ring 214 | (%) | 23 | 29 |

(*)comparative

EXAMPLE 3

EXAMPLE 3A
Low Mooney Polymer Synthesis

In a 10 l autoclave, equipped with stirrer working at 545 rpm, were introduced, after evacuation, 6.5 l of demineralized water and 67.18 ml of a perfluoropolyoxyalkylene microemulsion previously obtained by mixing:

14.27 ml of an acid terminated perfluoropolyoxyalkylene of formula:

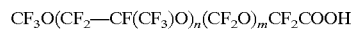

wherein n/m=10, and having an average molecular weight of 600;

14.27 ml of a 30% by volume NH$_4$OH aqueous solution;

28.54 ml of demineralized water;

10.1 ml of Galdent(R) D02 of formula:

wherein n/m=20, and having an average molecular weight of 450.

The autoclave was then heated to 80° C. and maintained at such temperature for the duration of the reaction. The following mixture of monomers was added:

| | |
|---|---|
| vinylidene fluoride (VDF) | 28% by moles |
| hexafluoropropene (HFP) | 57% by moles |
| tetrafluoroethylene (TFE) | 15% by moles | so as to bring the pressure to 30 bar.

Into the autoclave were then introduced;

0.325 g of ammonium persulphate (APS) as an initiator;

43.86 g of 1,6-diiodoperfluorohexane (C$_6$F$_{12}$I$_2$) as a chain transfer agent;

5.6 g of bis-olefin having the formula

the addition was carried out in 20 parts, each of 0.28 g, beginning from the polymerization starting and for every 5% increment in the monomer conversion.

The 30 bar pressure was maintained constant during polymerization by feeding a mixture consisting of:

| | |
|---|---|
| VDF | 50% by moles |
| HFP | 25% by moles |
| TFE | 25% by moles |

After 120 minutes of reaction, the autoclave was cooled, and the latex was discharged. 461.5 g/l of water of product with polymer Mooney viscosity, ML (1+10) at 121° C.

(ASTM D 1646), equal to 4, were thus obtained. The iodine percentage in the polymer is equal to 0.5% by weight. The molar composition measured by fluorine NMR is:

| VDF | 53% by moles |
|---|---|
| MVE | 23% by moles |
| TFE | 24% by moles |

EXAMPLE 3B
High Mooney Polymer Synthesis

By following the same procedure described for the polymerization 3A, a polymer of the same type was prepared wherein the amount of iodinated 1,6-diiodoperfluorohexane transfer agent was 17.55 g.

After 118 minutes of reaction, the autoclave was cooled, and the latex was discharged. 455 g/l of water of product with polymer Mooney viscosity, ML (1+10) at 121° C. (ASTM D 1646), equal to 80, were thus obtained. The iodine percentage in the polymer is equal to 0.19% by weight. The molar composition measured by fluorine NMR is:

| VDF | 53.5% by moles |
|---|---|
| HFP | 23.5% by moles |
| TFE | 23% by moles |

EXAMPLE 3C
Low Mooney Polymer Synthesis

By following the same procedure described for the polymerization 3A, a polymer of the same type was prepared wherein the iodinated 1,6-diiodoperfluorohexane transfer agent amount was 29.82 g.

After 110 minutes of reaction, the autoclave was cooled, and the latex was discharged. 460 g/l of water of product with polymer Mooney viscosity, ML (1+10) at 121° C. (ASTM D 1646), equal to 21, were thus obtained. The iodine percentage in the polymer is equal to 0.35% by weight. The molar composition measured by fluorine NMR is:

| VDF | 53.5% by moles |
|---|---|
| HFP | 23% by moles |
| TFE | 23.5% by moles |

The latexes obtained by the 3A, 3B, 3C syntheses were cocoagulated in the ratio: 9% by weight of latex 3A, 45% by weight of latex 3B and 46% by weight of latex 3C.

The Mooney viscosity ML (1+10) at 121° C. (ASTM D 1646) of the so obtained polymer was equal to 36.

The polymer was then cured by peroxides: the blend composition and the characteristics of the cured product are reported in Table 2.

EXAMPLE 4 (comparative)

By following the same procedure described for the polymerization 3A, a polymer of the same type was prepared wherein the iodinated 1,6-diiodoperfluorohexane transfer agent amount was 24.57 g.

After 115 minutes of reaction, the autoclave was cooled, and the latex was discharged. 460 g/l of water of product with polymer Mooney viscosity, ML (1+10) at 121° C. (ASTM D 1646), equal to 37, were thus obtained. The iodine percentage in the polymer is equal to 0.32% by weight. The molar composition measured by fluorine NMR is:

| VDF | 53.5% by moles |
|---|---|
| HFP | 23% by moles |
| TFE | 23.5% by moles |

The characteristics of the peroxide cured product are reported in Table 2.

TABLE 2

| EXAMPLE | | 3 | 4(*) |
|---|---|---|---|
| Blend composition | | | |
| Polymer | (g) | 100 | 100 |
| Luperco ® 101 XL | (phr) | 3 | 3 |
| Drimix ® TAIC | (phr) | 4 | 4 |
| ZnO | (phr) | 5 | 5 |
| Carbon black MT | (phr) | 30 | 30 |
| Blend characteristics | | | |
| *Mooney viscosity ML (1 + 10') 121° C. (ASTM D1646) | | 37 | 40 |
| *ODR 177° C. arc 3, 12' | (ASTM D2084-81) | | |
| ML | (pounds · inch) | 8 | 8 |
| MH | (pounds · inch) | 139 | 136 |
| $t_{s2}$ | (sec) | 57 | 58 |
| $ts_{50}$ | (sec) | 93 | 94 |
| $t'_{90}$ | (sec) | 120 | 120 |
| $V_{max}$ | (pounds · foot · inch/sec) | 2.9 | 2.9 |
| Gottfert rheovulcanometer P = 100 bar $T_{room}$ = 120° C. $T_{mold}$ = 160° C. t preheating = 60 sec t injection = 70 sec mold: spiral | | | |
| max flow-rate | mm3/sec | 65 | 75 |
| volume | mm3 | 1700 | 1800 |
| Characteristics after post-curing in stove at 230° C. for 1 h | | | |
| *MECHANICAL PROPERTIES | (ASTM D412-83) | | |
| Modulus at 100% | (MPa) | 7.8 | 8.2 |
| Stress break | (MPa) | 24.4 | 24.0 |
| Elongation at break | (%) | 227 | 210 |
| Shore A Hardness | (points) | 75 | 76 |

(*)comparative

What is claimed is:

1. Curable fluoroelastomers comprising the following fluoroelastomer mixture:

a) from 20 to 70% by weight of a fluoroelastomer having a Mooney viscosity, ML (1+10) at 121° C., greater than 60 points and containing from 0.01 to 3% by weight of iodine;

b) from 0 to 70% by weight of a fluoroelastomer having a Mooney viscosity, ML (1+10) at 121° C., greater than 20 to 60 points and containing from 0.2 to 5% by weight of iodine; and c) from 5 to 60% by weight of a fluoroelastomer having a Mooney viscosity, ML (1+10) at 121° C., in the range of 1–20 points and containing an iodine percentage by weight greater than 0.3, said Mooney viscosity, ML (1+10) at 121° C., measured according to ASTM D 1646 said fluoroelastomers comprise monomeric units derived from a bis-olefin having the formula:

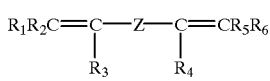

wherein:
R$_1$, R$_2$, R$_3$, R$_4$, R$_5$, and R$_6$ are equal to or different from each other, and are H or a C$_1$–C$_5$ alkyl; Z is a C$_1$–C$_{18}$ alkylene or cycloalkylene radical, linear or branched, optionally containing oxygen atoms, at least partially fluorinated, or a (per) fluoropolyoxyalkylene radical.

2. A curable fluoroelastomer according to claim 1, of the following fluoroelastomer mixture:
a) from 20 to 50% by weight of a fluoroelastomer having a Mooney viscosity, ML (1+10) at 121° C., greater than 70 points and containing from 0.05 to 2% by weight of iodine;
b) from 0 to 50% by weight of a fluoroelastomer having a Mooney viscosity, ML (1+10) at 121° C., in the range of 30–50 points and containing from 0.2 to 3% by weight of iodine; and
c) from 10 to 30% by weight of a fluoroelastomer having a Mooney viscosity, ML (1+10) at 121° C., in the range of 5–15 points and containing an iodine percentage by weight greater than 0.5.

3. Fluoroelastomers according to claim 1, wherein in the formula (I) Z is a C$_4$–C$_{12}$ perfluoroalkylene radical, while R$_1$, R$_2$, R$_3$, R$_4$, R$_5$, R$_6$ are hydrogen.

4. Fluoroelastomers according to claim 1 wherein Z is a perfluoropolyoxyalkylene radical, having the formula:

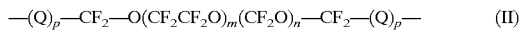

wherein: Q is a C$_1$–C$_{10}$ alkylene or oxyalkylene radical; p is 0 or 1; m and n are integers such that the m/n ratio is between 0.2 and 5 and the molecular weight of said (per) fluoropolyoxyalkylene radical is in the range 500–10,000.

5. Fluoroelastomers according to claim 1 wherein the chain unit amount derived from said bis-olefins is in the range 0.01–1.0 moles, per 100 moles of the other base monomeric units.

6. Fluoroelastomers according to claim 5 wherein the chain unit amount derived from said bis-olefins is in the range 0.05–0.2% moles.

7. Fluoroelastomers according to claim 1 wherein the base fluoroelastomer structure is selected from:
(1) VDF-based copolymers, wherein VDF is copolymerized with at least a comonomer selected from: C$_2$–C$_8$ per-fluoroolefins; chloro- and/or bromo- and/or iodo- C$_2$–C$_8$ fluoroolefins, (per)fluoroalkylvinylethers (PAVE) CF$_2$=CFOR$_f$, wherein R$_f$ is a C$_1$–C$_6$ perfluoroalkyl, for example trifluoromethyl, bromodifluoromethyl, penta-fluoropropyl; perfluoro-oxyalkylvinylethers CF$_2$=C-FOX, wherein X is a C$_1$–C$_2$ perfluoro-oxyalkyl having one or more ether groups non fluorinated (Ol) C$_2$–C$_8$ oelfins;
(2) TFE-based copolymers, wherein TFE is copolymerized with at least a comonomer selected from:
(per) fluoroalkylvinylethers (PAVE) CF$_2$=CFOR$_f$, wherein R$_f$ is as above defined; perfluoro-oxyalkylvinylethers CF$_2$=CFOX, wherein X is as above defined; C$_2$–C$_8$ fluoroolefins containing hydrogen and/or chlorine and/or bromine and/or iodine atoms; non fluorinated (Ol) C$_2$–C$_8$ olefins.

8. Fluoroelastomers according to claim 7 wherein the base monomer compositions are selected from:
(a) VDF 45–85%, HFP 15–45%, TFE 0–30%; (b) VDF 50–80%, PAVE 5–50%, TFE 0–20%; (c) VDF 20–30%, Ol 10–30%, HFP and/or PAVE 18–27%, TFE 10–30%; (d) TFE 50–80%, PAVE 20–50%; (e) TFE 45–65%, Ol 20–55%, VDF 0–30%; (f) TFE 32–60%, Ol 10–40%, PAVE 20–40%; (g) TFE 33–75, PAVE 15–45%, VDF 5–30%.

9. Fluoroelastomers according to claim 1, wherein the fluoroelastomers are peroxide curable and the curing blend includes:
(a) curing coagents, in an amount in the range of 0.5–10% by weight with respect to the polymer, selected from: triallyl-cyanurate; triallylisocyanurate (TAIC); tris (diallylamine)-s-triazine; triallylphosphite; N,N-diallyl-acrylamide; N,N,N'N'-tetraallylmalonamide; trivinyl-isocyanurate; 2,4,6-trivinyl-methyltrisiloxane; N,N'bisallylbicylo-oct-7-ene-disuccinimide (BOSA); bis-olefin of formula (I), triazines having the formula:

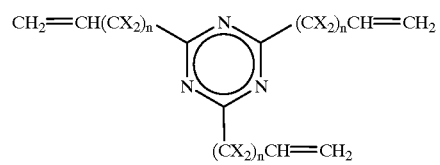

wherein X is independently hydrogen, chlorine, fluorine, C$_1$–C$_3$ alkyl or perfluoroalkyl; n is an integer in the range of 2–20;
(b) a metal compound in amounts in the range of 1–15% by weight with respect to the polymer, selected from oxides or hydroxides of divalent metals optionally associated with a weak acid salt; and
(c) conventional additives.

10. A process for obtaining the curable fluoroelastomer as defined in claim 1, wherein said fluoroelastomer is obtained in situ in a single polymerization by dosing fluoroelastomers a, b, and c during polymerization.

11. A process for preparing an O-ring, a shaft seal or gasket comprising molding and curing fluoroelastomers comprising the following mixture:
a) from 20 to 70% by weight of a fluoroelastomer having a Mooney viscosity, ML (1+10) at 121° C, greater than 60 points and containing from 0.01 to 3% by weight of iodine;
b) from 0 to 70% by weight of a fluoroelastomer having a Mooney viscosity, ML (1+10) at 121° C, greater than 20 to 60 points and containing from 0.2 to 5% by weight of iodine; and
c) from 5 to 60% by weight of a fluoroelastomer having a Mooney viscosity, ML (1+10) at 121° C, in the range of 1–20 points and containing an iodine percentage by weight greater than 0.3, said Mooney viscosity, ML (1+10) at 121° C, measured according to ASTM D 1646; said fluoroelastomers comprise monomeric units derived from a bis-olefin having the formula:

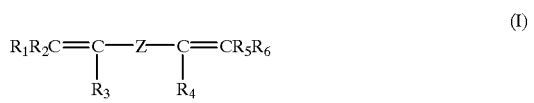

wherein:
R$_1$, R$_2$, R$_3$, R$_4$, R$_5$, and R$_6$ are equal to or different from each other, and are H or a C$_1$–C$_5$ alkyl; Z is a C$_1$–C$_{18}$ alkylene or cycloalkylene radical, linear or branched, optionally containing oxygen atoms, at least partially fluorinated, or a (per) fluoropolyoxyalkylene radical.

12. A process for obtaining curable fluoroelastomers comprising:
1) polymerizing separately the fluoroelastomers
    a) having a Mooney viscosity greater than 60 points and containing from 0.01 to 3% by weight of iodine;
    b) having a Mooney viscosity greater than 20 to 60 points and containing from 0.2 to 5% by weight of iodine; and
    c) having a Mooney viscosity in the range of 1–20 points and containing an iodine percentage by weight greater than 0.3, to form a latex; and
2) coagulating the latex of a)–c) to obtain a fluoroelastomer mixture comprising
    a) from 20 to 70% by weight of a fluoroelastomer having a Mooney viscosity, ML (1+10) at 121° C, greater than 60 points and containing from 0.01 to 3% by weight of iodine;
    b) from 0 to 70% by weight of a fluoroelastomer having a Mooney viscosity, ML (1+10) at 121° C, greater than 20 to 60 points and containing from 0.2 to 5% by weight of iodine; and
    c) from 5 to 60% by weight of a fluoroelastomer having a Mooney viscosity, ML (1+10) at 121° C, in the range of 1–20 points and containing an iodine percentage by weight greater than 0.3, said Mooney viscosity, ML (1+10) at 121° C, measured according to ASTM D 1646, wherein said fluoroelastomers comprise monomeric units derived from a bis olefin having the formula:

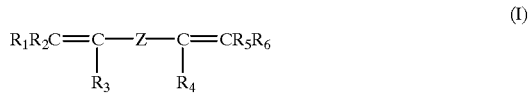

(I)

wherein:
R$_1$, R$_2$, R$_3$, R$_4$, R$_5$, and R$_6$ are equal to or different from each other, and are H or a C$_1$–C$_5$ alkyl; Z is a C$_1$–C$_{18}$ alkylene or cycloalkylene radical, linear or branched, optionally containing oxygen atoms, at least partially fluorinated, or a (per) fluoropolyoxyalkylene radical.

13. Process for obtaining curable fluoroelastomers according to claim 12, comprising polymerizing the fluoroelastomers in an aqueous emulsion.

14. Process for obtaining curable fluoroelastomers according to claim 13, wherein the aqueous emulsion is a perfluoropolyoxyalkylene emulsion, a dispersion or a microemulsion.

15. Process for obtaining curable fluoroelastomers according to claim 12, wherein the fluoroelasteromer is isolated by coagulation.

* * * * *